Oct. 21, 1969  W. T. S. MONTGOMERY  3,473,742
MACHINE FOR THE PUNCHING AND CUTTING OF WOOD
Filed Oct. 25, 1966  4 Sheets-Sheet 2
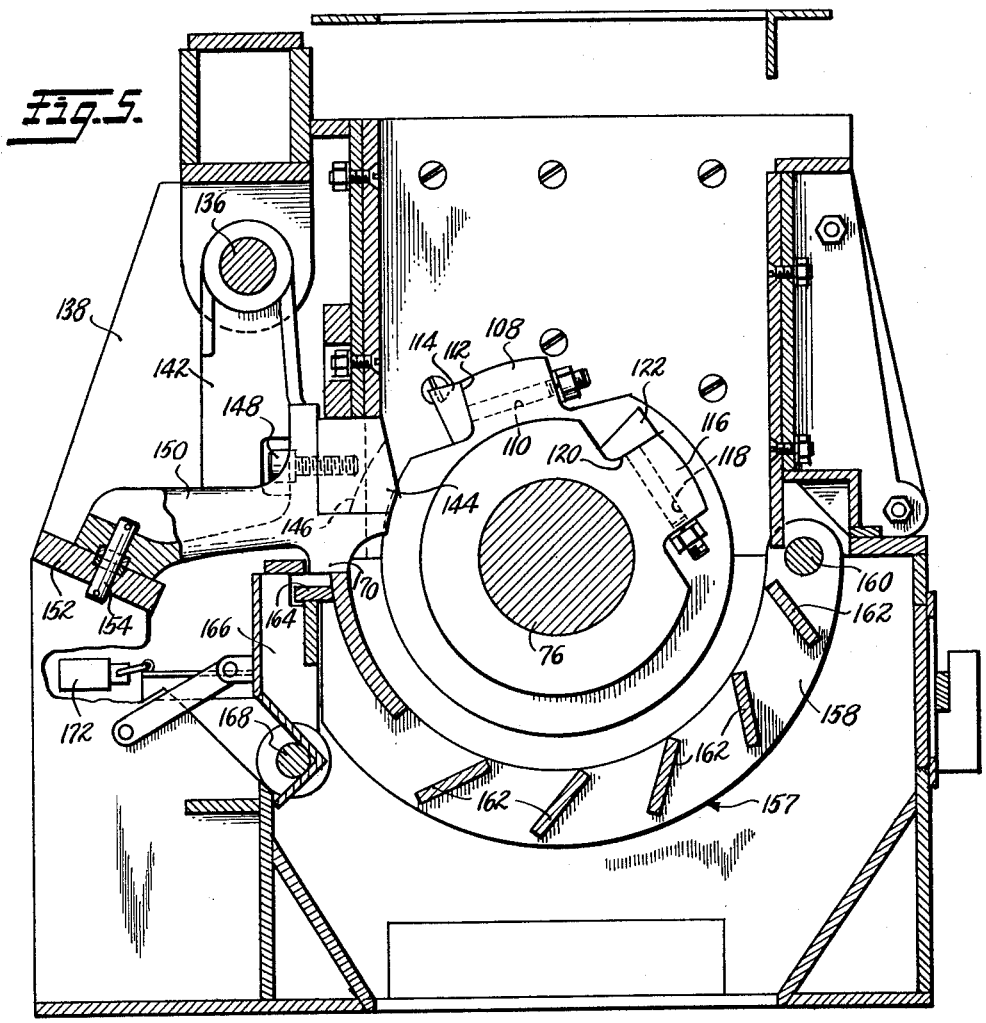
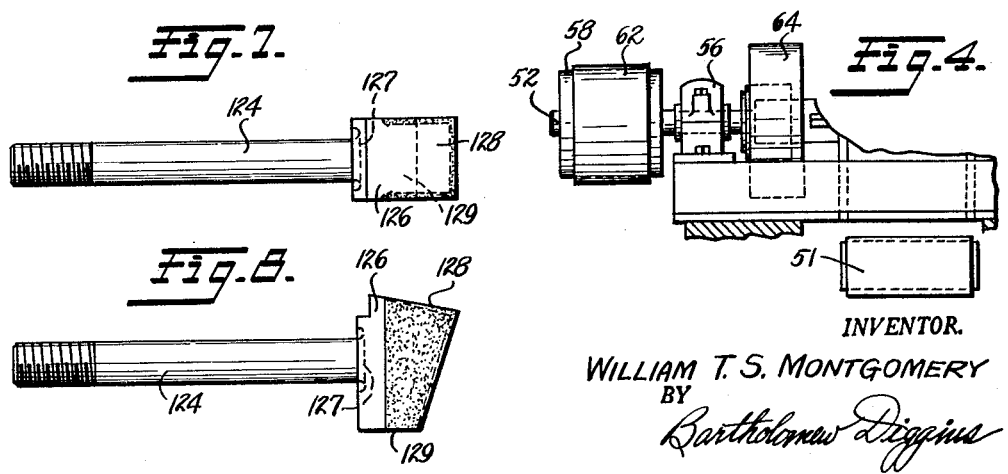
INVENTOR.
WILLIAM T. S. MONTGOMERY
BY
Bartholomew Diggins
ATTORNEY Oct. 21, 1969  W. T. S. MONTGOMERY  3,473,742
MACHINE FOR THE PUNCHING AND CUTTING OF WOOD
Filed Oct. 25, 1966  4 Sheets-Sheet 3
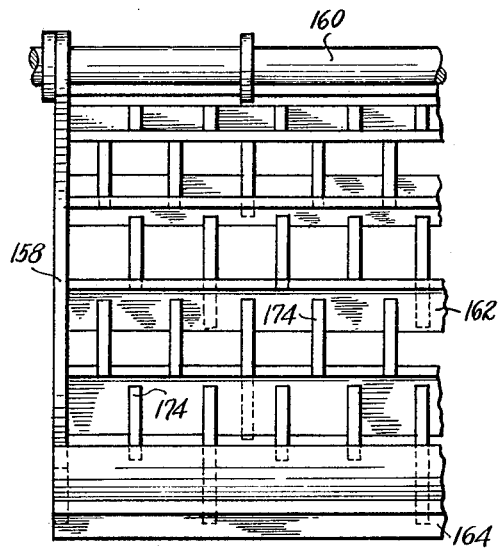
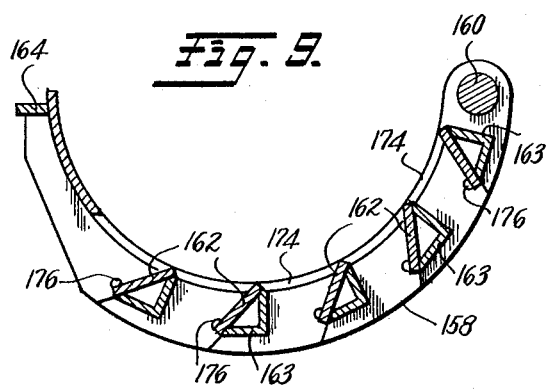
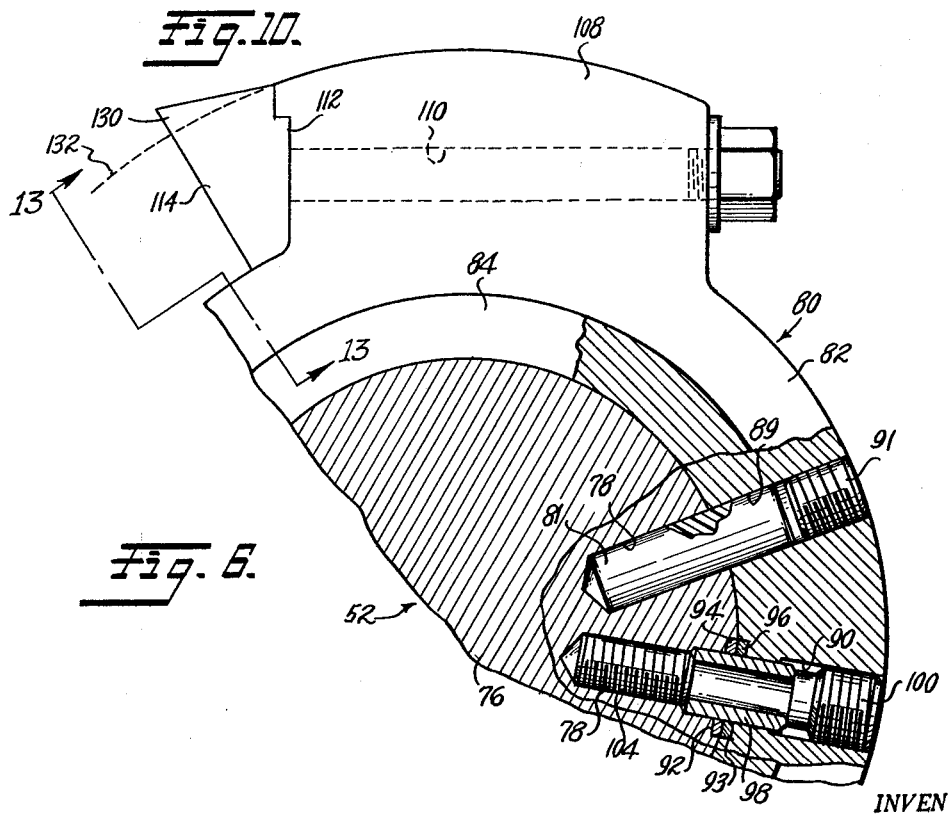
INVENTOR.
WILLIAM T. S. MONTGOMERY
BY
ATTORNEY Oct. 21, 1969   W. T. S. MONTGOMERY   3,473,742
MACHINE FOR THE PUNCHING AND CUTTING OF WOOD
Filed Oct. 25, 1966   4 Sheets-Sheet 4

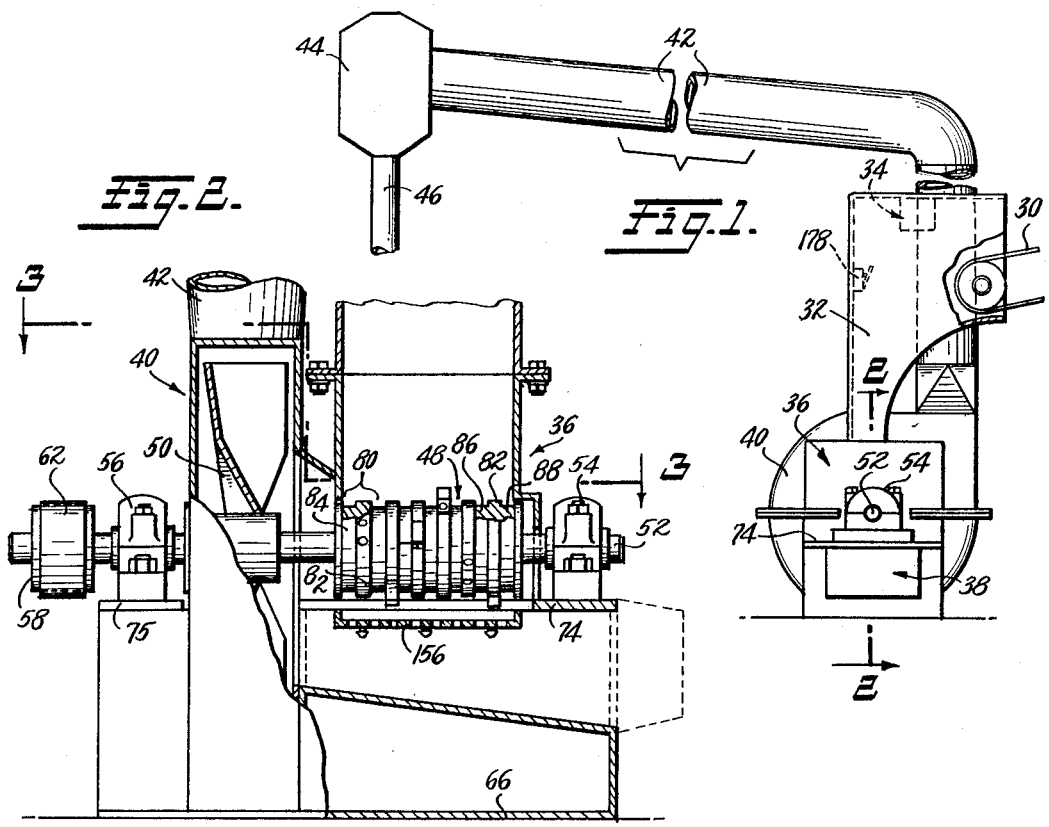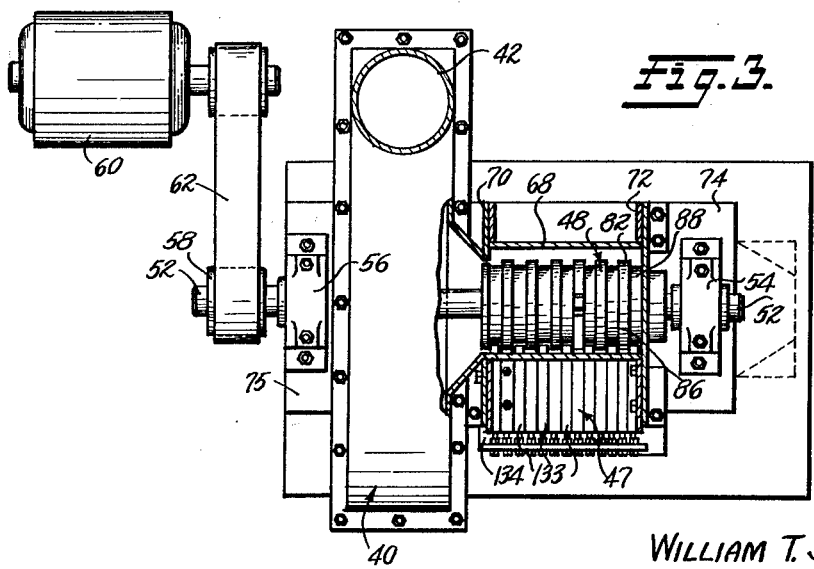

INVENTOR.
WILLIAM T. S. MONTGOMERY
BY
Bartholomew Diggins
ATTORNEY

United States Patent Office 3,473,742
Patented Oct. 21, 1969

3,473,742
MACHINE FOR THE PUNCHING AND
CUTTING OF WOOD
William T. S. Montgomery, Jacksonville, Fla., assignor to Jacksonville Blow Pipe Company, Jacksonville, Fla., a corporation of Florida
Filed Oct. 25, 1966, Ser. No. 589,310
Int. Cl. B02c 19/12, 23/04, 17/02
U.S. Cl. 241—32
13 Claims

ABSTRACT OF THE DISCLOSURE

Wood breaking mechanism having a rotor and a fixed breaker. The rotor has mounted thereon alternate large and small rings each of which has radially projecting teeth cooperating with teeth on the fixed breaker. Lubricant-emitting, severable means non-rotatably secure the rings to the rotor such that friction is decreased upon severance of the severable means. A shear pin holds the fixed breaker in wood-breaking relation with the rotor so that upon overload the pin is sheared and the fixed breaker swings away.

---

The present invention relates to apparatus for the reduction of hard, tough material such as wood, to small easy to handle usable pieces. While the invention is chiefly used in industries involving wood, it is equally usable with similar materials such as plastics, synthetic materials such as "hardboard," "softboard" and the like.

The reduction of large pieces or chunks of material to relatively small size occurs in a number of industries involving an almost limitless number of materials and various devices have been provided for this purpose and have been more or less successful in their specific applications. For example, hard, brittle materials such as ice and coal can be successfully reduced in size by so-called "hammer hogs" where the large pieces are subjected to the impact of rotating, swinging hammers. Materials which are relatively soft, uniform and non-abrasive can often be reduced by chippers or similar devices employing sharp knife edges.

Wood presents problems peculiar to itself so that neither the hammer hog nor devices employing knife edges are satisfactroy or practical except in a few specialized applications. Wood varies from soft spongy material like balsam to hard dense material such as pecan, dogwood and lignum vitae. In all of its forms, wood is fibrous and stringy and not brittle or crystaline, so that impact in a hammer hog, for example, would not fragment the wood but would tend more to tear off long grainy strips.

In different industries, the wood to be reduced occurs in a wide variety of forms, such as log butts, billets and chunks and forms occur in a wide variety of conditions. For example, in a veneer mill, waste may occur in any form from a hard, tough, dry log butt to soft, moistured-saturated, sheets as well as trimmed ends of finished plywood.

One of the principal applications of wood reducing machines of the present invention is the reduction of waste to a form and size where it may be easily handled and easily disposed of or to a useful product such as fuel.

There are other problems which are peculiar to wood and similar materials. Lumber and particularly bark, frequently contain a substantial amount of sand and other highly abrasive materials. Waste lumber such as railroad ties often contain spikes or other stray chunks of steel and obviously disposal of such waste would not justify the cost of rigid inspection. Waste plastic, hardboard, softboard, or the like may contain nails, screws or other stray bits of hardware. Obviously, a hammer hog would have little or no effect on such material and apparatus involving knife edges would have such a short effective life as to be substantially worthless.

In some industries, the small bits or pieces of wood is itself a valuable end product. For example, small pieces of wood are necessary in the wood pulp or paper industry and for chicken litter, cattle bedding and the like. Often the wood employed in the production of these products is relatively soft, relatively uniform and relatively free from foreign matter such as abrasive sand and tramp iron. An apparatus employing knife edges can sometimes be successfully used for the final reduction of the wood to ultimate size but the life of these machines and the life of the knife edges between resharpening and readjustment can be greatly prolonged if the wood is first suitably reduced.

The apparatus of the present invention will reduce wood regardless of the hardness or softness of the wood itself and regardless of the form in which it occurs. The apparatus is also substantially impervious to the effect of abrasive sand contained in the wood or bark and to the effect of tramp iron which may find its way into the apparatus.

Basically, the present apparatus operates on a principle quite different from that of the swinging hammer or the sharp knife edge. In the apparatus of the present invention, there is a fixed breaker having spaced teeth and a rotary breaker having fixed spaced rigid teeth which pass between the teeth of the fixed breaker in a punching operation rather than the impacting of a hammer or the cutting of a knife, even though the operation of the present apparatus involves both impact and shear.

From the relatively crude early forms, the apparatus of the present invention has embodied this punching action but various improvements and developments have been made to improve the operation of the apparatus, to broaden and extend its use and application to other and different materials, to meet and solve other and different problems, and generally to extend its range of application, its economy of operation, and its application to new and different products and industries. The present apparatus can accept a wider variety of materials to be reduced and materials having a wider variety of difficulties and drawbacks, and can also produce an end product, reduced material, meeting more exacting requirements and specification.

U.S. Letters Patent No. 2,869,793 issued Jan. 20, 1959, entitled "A Machine for Punching and Cutting of Wood" discloses several forms of apparatus for reducing wood and similar material to small, easily handled pieces, and also discloses systems for conveying such reduced wood to a point of collection or disposal. That apparatus is generally similar in principle to that of the present invention and is highly efficient and successful in the uses for which it is adapted. The present invention relates to improvements and modifications of the apparatus disclosed in that patent referred to.

The present invention provides improved safety features minimizing the shut-down time required when tramp iron or other foreign material is accidentally introduced into the feed hopper. Such tramp iron or other foreign material is automatically discharged from the wood breaking area and the apparatus can be returned to full operating condition with a minimum of lost time. Even large pieces of tramp iron, or the like, will not seriously or permanently damage the device. The safety features of the present invention are all such as can be readily and quickly replaced or repaired, so that in the event of an accidental overload, due to tramp iron or other foreign material, the apparatus can be quickly returned to operating condition.

The apparatus of the present invention also involves improvements whereby the wood or other material is reduced to substantially uniform pieces or chips and long strips which pass through the cutting or punching area are returned for further cutting or punching.

Since the apparatus of the present invention is intended to reduce wood or similar material in whatever random forms or conditions which might occur, pieces too large or too long for handling in the primary punching or breaking mechanism are automatically reduced to suitable size.

One of the objects of the present invention is to provide improved apparatus for reducing wood and the like, which apparatus is simple, efficient, and rugged in construction and adaptable to varied conditions of operation.

Another object is to provide an improved apparatus for reducing wood or the like, in which the active working parts are effectively protected against damage or accidental breakage.

A further object is to provide an improved wood breaker having two sets of cooperating, intermeshing teeth, one set mounted upon a fixed member, the other set being mounted upon a driven member and breakable connectors between the teeth and the members.

Another object is to provide an improved apparatus for reducing large chunks or pieces of wood or the like to particles of predetermined maximum size in which broken particles exceeding the predetermined maximum size are separated and returned for further breaking.

Another object of the present invention is to provide an improved wood breaking apparatus of the type having spaced, relatively fixed teeth and cooperating, intermeshing, relatively movable teeth in which the relatively fixed teeth are movably mounted upon a fixed support and held in operating position by connecting elements which are breakable upon overload.

Another object of the present invention is to provide an improved wood breaker having toothed rings mounted on a rotary driven member, and efficient overload connection between the rings and member.

Another object of the present invention is to provide a wood breaking mechanism having a rotary with radially projecting high and low teeth the outer edges of the high teeth being wider than the space between the high teeth.

Another object of the invention is to provide wood breaking apparatus having fixed spaced teeth and a rotary member having teeth projecting between the teeth of the fixed member in which the fixed teeth are held in breaking position by shear members and upon breaking of the shear members are movable so as to permit egress of foreign matter from the apparatus.

Another object of the invention is to provide a wood breaking apparatus having cooperating, fixed and driven teeth in which a screen is provided beneath the breakers to separate over-sized pieces for further breaking and in which the screen is automatically released upon excessive overload.

It is also an object of the invention to provide apparatus for reducing materials such as wood and the like having a breaking zone and a hopper for feeding the materials to be reduced to the breaking zone, in which the hopper is provided with means for automatically reducing the incoming materials to a size suitable for reduction in the reducing zone.

Another object is to provide an improved tool for a wood breaker mechanism.

Other details, objects and advantages of the present invention will become apparent from the following description of the novel features of the construction, arrangement and combinations of the parts, taken in conjunction with the drawings which accompany and form part of the specification.

Referring to the drawings:

FIGURE 1 is an end elevation of the apparatus embodying my invention;

FIGURE 2 is a section taken on line 2—2 of FIG. 1;

FIGURE 3 is a section taken on line 3—3 of FIG. 2;

FIGURE 4 is a fragmentary side elevation of a modified breaker having a conveyor belt chip removal system;

FIGURE 5 is an enlarged fragmentary vertical section of a preferred form of wood breaker;

FIGURE 6 is an enlarged fragmentary view similar to FIG. 5 illustrating the shear pins;

FIGURE 7 is a top plan view of a preferred form of breaker tooth;

FIGURE 8 is a side elevation of the breaker tooth shown in FIG. 7;

FIGURE 9 is a vertical section of a modified form of breaker screen;

FIGURE 10 is a top plan view of the breaker screen shown in FIG. 9;

Figures 11, 12:
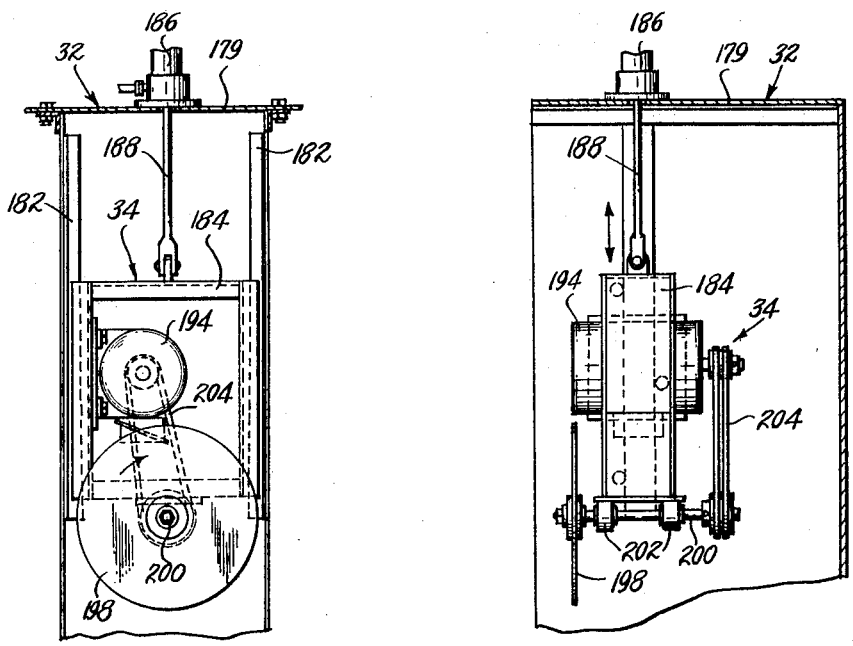
FIGURE 11 is a fragmentary front elevation of the mechanism for reducing oversize logs or chunks.
FIGURE 12 is a side elevation of the mechanism shown in FIG. 11.
Figure 13:
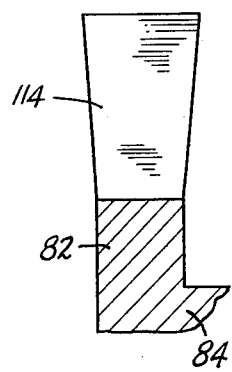
FIGURE 13 is a fragmentary section taken on lines 13—13 of FIGURE 10 showing the taper of the large tooth member.

In the modification shown in FIGS. 1 to 3 wood to be reduced is fed to the apparatus by any suitable means such as a conveyor belt 30 into the hopper 32. The wood or other material being fed into the hopper first passes the cutting unit indicated generally at 34 in FIG. 1 and shown more particularly in FIGS. 11 and 12.

The wood drops down through the hopper 32 into the breaking or punching mechanism indicated generally at 36 and after being punched or broken into small pieces, drops into a conduit indicated generally at 38 from which it is drawn into a centrifugal fan or blower 40 and passed into a conduit 42 connected to a centrifugal separator 44. The reduced or broken wood particles are discharged from the separator 44 through a pipe or conduit 46.

The wood breaker consists of a fixed unit 47 and a rotor unit 48 and in the modification shown in FIGS. 1, 2 and 3, the rotor 48 and the fan 50 are both mounted on a shaft 52 journalled in bearings 54 and 56. A pulley 58 is fixed to the shaft 52 and may be driven by a suitable engine or motor 60 through a belt 62 as shown in FIG. 3. The rotor 48 and the fan 50 are of such size and weight that a flywheel is not normally needed.

In the embodiment shown in FIG. 4, the fan and blowpipe systems are omitted and the broken wood is dropped onto a conveyer belt 51 or other conveying mechanism. In this embodiment, it may be desirable to provide a flywheel 64 on the shaft 52. Of course the wood or other reduced material may be dropped directly onto a pile or into a truck and conveyed to the location of use or disposal.

Referring particularly to FIG. 1–3, the apparatus comprises a base 66 which carries both the breaker mechanism 36 and a blower system 40 as hereinafter described. The breaker mechanism is mounted upon a frame which comprises longitudinal side walls 68, transverse end walls 70 and 72, all of which extend upward substantially vertically from the base 66 and are secured to each other to form the breaker apparatus frame structure as shown in FIGS. 1 to 3. A relatively heavy support plate 74 is secured substantially horizontally to the top edges of side walls 68, 70 and 72. Another such support 75 is mounted in a similar manner on side walls 68 above the opposite end of base with its upper surface in substantially the same horizontal plane as the upper surface of support 74. Fan system 40 is mounted on the support 75 as shown in FIGS. 2 and 3.

The breaker mechanism consists of the toothed rotor 48 and fixed dies indicated generally at 47 located between the transverse end walls 70 and 72. The portion 76 of the shaft located between the walls 70 and 72 is provided with a plurality of radial bores 78 (FIG. 6) which are arranged in sets, each set being in the same plane perpendicular to the axis of the shaft 52.

For reasons later described, the preferred form of rotary breaker comprises a plurality of ring units 80 as shown in FIG. 6, rotatably mounted on portion 76 of shaft 52. The ring unit 80 may be forged or cast and each includes a large ring 82 and a small ring 84 formed as an integral unit. One end ring unit 80 consists of three rings, a large center ring 82 with two small rings 86 and 88, respectively, formed on each side thereof as shown in FIG. 2. Ring units 80 are mounted along shaft 52 so that large and small rings 82 and 84 alternate as shown in FIGS. 2 and 3, with one ring unit 80 to each set of holes 78.

Each ring unit 80 is provided with a set of bores 90 extending radially through the ring unit and corresponding in number and spacing to the bores 78 in the shaft portion 76. As later described in detail, the bores 78 and 90 are for the purpose of receiving shear pins for locking the ring units 80 against rotation on the shaft portion 76 during normal operation and the number of bores in each set determines the safety factor, i.e., the load at which the shear pins break and release individual ring units to rotate freely on the shaft.

As shown in FIG. 6, each bore 78 in shaft portion 76 is preferably provided with a counterbore 92 and each corresponding radial hole in ring 82 is provided with a counterbore 93 at the inner circumference of ring unit 80. When counterbores 92 and 93 are provided, a pair of hardened steel bushings 94 and 96 are inserted in counterbores 92 and 93, respectively, and the adjacent faces are suitably curved as shown in FIG. 6. Ring unit 80 is secured to the enlarged portion 76 of shaft 52 by one or more hollow shear pins 98 extending through bushings 94 and 96. The shear pins 98 may be held in place by any suitable means such as a snap ring but I prefer a set screw 100 threaded into the tapped portion 102 of bore 90 and the threads of the screw 100 may be burred to lock the screws in place. Each bore 78 is tapped to receive a hollow head screw 104 to position the shear pin 98 in the bushings. Should pins 98 shear under overload, hollow head screw 104 is utilized to back the broken part of pins 98 out of mounting holes 78 so that new shear pins may be inserted.

When there is a severe local overload such as would be caused by a sledge hammer head accidentally dropped into the mechanism, the shear pins connecting the affected ring unit break and permit the ring unit to rotate on the shaft. It is desirable that this rotation be as frictionless as possible. This is accomplished by providing lubrication between the ring unit and shaft.

A preferred system of lubrication is illustrated in FIG. 6 in which extra bores 79 and 89 are provided in each set in the shaft and each ring unit. These bores 79 and 89 have straight sides for receiving a lubricant cartridge 81 of suitable material such as plastic, soft metal or the like. The lubricant cartridge has thin walls and upon breakage of the shear pins, the cartridge also breaks, flooding the space between the ring unit and the shaft with lubricant. The cartridge may be locked in place by a screw 91.

In one embodiment of the invention as shown particularly in FIGS. 5 and 6, the large ring 82 of each ring unit 80 is provided with a large tooth support 108 projecting substantially radially and having a bore 110 therein extending transversely of the ring's axis. The forward end of tooth support 108 has a tooth receiving seat 112 as shown in FIG. 6 so that a removable large tooth 114 may be rigidly supported as described below.

Each small ring unit 84 is provided with a similar radially projecting tooth support 116 having a bore 118 extending transversely of the ring's axis. The forward end of the small tooth support 116 has a seat 120 as shown in FIGS. 5 and 6 for receiving a removable small tooth 122. A preferred form of removable tooth is shown in FIGS. 7 and 8. This tooth consists of a threaded shank 124 and an enlarged head 126. This enlarged head is preferably faced with a hard material such as the metal carbides sold under the names Carboloy, Stoodite, etc.

The rear surface of the enlarged head 122 is shaped to conform to the seat or recess 112 or 120 and the rear surface of the enlarged head is provided with a groove 127 surrounding the threaded shank 124. The upper or cutting face 128 of the tooth is wider than the lower surface 129 and the sides of the tooth taper inwardly from top to bottom the prevent soft, spongy wood from wedging between adjacent teeth.

The small breaker teeth are angularly located either slightly ahead, or slightly behind, the large breaker teeth. When the large breaker teeth pass between the long teeth of the fixed breaker, they punch out chunks or pieces, leaving notches along the edge of the wood to be broken. After the large teeth pass, the wood drops down, and the projections between these notches are broken off by the small breaker teeth. The wood then drops further for engagement with the large breaker teeth.

The large breaker teeth and the companion small teeth may be positioned in different ways along the shaft portion 76. When the large breaker teeth are positioned in a spiral along the shaft, the shaft is statically balanced. However, I have found that there is such a high turbulence in the breaking area that the wood or other material requires time to drop down for successive engagements by the large breaker teeth. Positioning the large breaker teeth along a line parallel to the axis of the shaft results in some static imbalance of the rotor but allows time for the wood or other material to drop down after impact by the large teeth before the large teeth again reach the cutting or breaking position.

As shown in FIGURE 6, the forward top edge 130 of each large tooth extends substantially beyond the extended base circle 132 of the tooth support projection 108. This extension of the cutting or punching edge permits the handling of large bulky materials such as railroad ties, log butts and the like.

The fixed die or breaker may consist of individual breaker units 133 rigidly secured to a base plate 134 as indicated generally at 47 in FIG. 3 and as shown in greater detail in my Patent No. 2,869,793 but the preferred form of fixed breaker or die unit is shown in detail in FIG. 5.

Referring to FIG. 5, a shaft 136 is mounted between the end walls 138 and extends parallel to the axis of the shaft 76. Individual fixed breaker arms or members 142 are pivotally mounted on the shaft 136.

Opposite the rotor, each breaker arm 142 carries a large and a small breaker tooth 144 and 146 respectively, corresponding with the small and large teeth respectively of the rotor. The large tooth 146 of each fixed breaker preferably projects a short distance between adjacent large rings of the rotor and these fixed breaker tooth units are suitably secured to the individual arm 142 by a bolt 148. The fixed breaker teeth are also suitably hard-faced with a material such as Carboloy, Stoodite, or the like.

A portion of each arm 142 extends rearwardly as indicated at 150 and is secured to a fixed transverse plate 152 which extends across the wood breaker unit. Each arm 142 is suitably secured to the plate 152 by a shear pin 154.

Generally, the shear pins 154 are weaker than the shear pins 98 securing the ring units 80 to the shaft 76 so that when any hard foreign object, such as a railroad spike or sledge hammer head comes between the rotor and fixed breaker, the shear pins 154 will first shear, permitting the arms 142 of the fixed breaker unit to pivot on the shaft 136 and swing out of the way. This not only prevents serious damage to the woodbreaking mechanism but also leaves an opening through which the foreign material may be ejected. The shear pins 154 can be readily replaced without the necessity of opening the interior of the apparatus.

Beneath the rotor 48 there is provided a screen or the like for preventing oversize broken pieces of material from dropping into the intake 38 of the blower system. This may be either a fixed screen indicated at 156 and as shown in more detail in my Patent No. 2,869,793 but I prefer a screen unit indicated generally at 157 as shown in FIGS. 5 and 9. As shown in FIG. 5, the screen 157 comprises two arcuate end plates 158 adjacent each end of the rotor pivotally mounted upon a shaft 160. A plurality of slats or plates 162 extend between the two end plates 158 and, if desired, these plates may be reinforced by angle irons indicated at 163 as shown in FIG. 9.

Remote from the shaft or pivot 160, the screen unit 157 is provided with a projection 164 which, in normal operation, rests upon a latch or detent 166 pivoted at 168 on a side wall 138 of the breaker housing. A portion of the latch or detent 166 is positioned in the path of a downward projection 170 of the arm 142 carrying the fixed breaker member so that when the shear pin 154 is broken, and the fixed breaker unit swings clockwise on the shaft 136, as viewed in FIG. 5, the latch or detent 166 releases the screen unit 157 permitting the screen unit to swing counter-clockwise on the shaft 160 to drop down and release any foreign material which might otherwise be held on the screen.

The latch or detent 166 actuates a switch 172 to open the circuit of the motor 60, stopping the breaker apparatus.

A plurality of strips 174 extend transversely between the slats 162 forming the screen and preferably the lower portion of each slat 162 is provided with a projection 176 which prevents long strips or pieces of wood from passing through the screen unit.

When a log or piece of wood is too large to pass through the throat of the hopper 32, it contacts a suitably located switch 178 shown in FIG. 1 which actuates the mechanism shown in detail in FIGS. 11 and 12.

Within the hopper 32, adjacent the top 179, there are two substantially vertical longitudinal slides 182, in which a carriage 184 is slidably mounted. The carriage 184 may be raised and lowered in various ways.

In the embodiment shown in FIGS. 11 and 12, a hydraulic or air cylinder 186 is mounted on the top 179 of the hopper 32 and a piston rod 188 extends downward and is secured to the carriage 184. When the switch 178 is actuated by an oversized log, for example, the switch actuates the cylinder 186 by suitable means not shown, to lower the carriage 184. When the carriage 184 reaches its lowest position, it actuates a reversing switch, not shown, to reverse the cylinder 186 and raise the carriage 184. The hydraulic or air cylinder 186 may be replaced by a motor or other drive means, and the control switches may be replaced by control valves or other controls. Suitable counterweights not shown may also be provided to balance the carriage 184.

A saw 198 is mounted upon a shaft 200, journaled in bearings 202, mounted on the carriage 184. A motor 194, also mounted on the carriage 184, drives the shaft 200 by a belt 204. As the carriage 184 moves downward, the saw 198 cuts the oversize log to a suitable length or size to pass down through the throat of the hopper 32. As soon as the saw has passed through the oversize log, the slide 184 actuates the reversing switch, not shown, which disconnects the motor 194 and reverses the cylinder 186, to raise the carriage out of the path of incoming wood or other material.

Throughout the specification, parts have been described as welded together and it is to be understood that the parts could be secured together by other means. However, because of the power of this apparatus and the difficulty of the work it performs permanent rigidity of the parts is essential and welding is generally preferred, From the foregoing it is apparent that I am able to attain the objects of my invention and provide a simple and efficient apparatus for reducing woods of all types and in any condition, and to also provide a system for converting wet wood into dry, easily handled fuel.

The present invention may be embodied in other specific forms without departing from the spirit or essential characteristics thereof, and the present embodiments are therefore to be considered in all respects as illustrative and not restrictive. The scope of the invention is indicated by the appended claims, rather than by the foregoing description and all changes which come within the meaning and range of equivalency of the claims are therefore intended to be embraced therein.

What is claimed and desired to be secured by United States Letters Patent is:

1. A wood breaking mechanism comprising a support, a fixed breaker carried by said support and having teeth along one edge, a rotor rotatably mounted on said support, said fixed breaker having a surface inclined downwardly toward said rotor, a plurality of longitudinally spaced long teeth projecting outwardly from said rotor between the teeth on said fixed breaker, and short teeth projecting outwardly into wood breaking relation to a point adjacent the ends of the teeth on said fixed breaker, the leading cutting edges of said long teeth overlapping the leading cutting edges of the short teeth.

2. In a wood breaker, a support, a member rotatably mounted on said support, a plurality of large rings and small rings mounted on said member coaxially with said member and spaced alternately along said member, a tooth projecting substantially radially from each large ring, a tooth projecting substantially radially from each small ring, severable means non-rotatably securing said rings to said member including lubricant emitting means for decreasing friction between said rings and said rotatably mounted member upon the severence of the severable means non-rotatably securing said rings to said member.

3. A wood breaker as defined in claim 2 wherein said lubricant emitting means comprises a plastic oil cylinder positioned in said rings and extending into said rotatably mounted member.

4. In a wood breaker apparatus, support means, a breaker mechanism comprising a rotary member mounted on said support means and having a plurality of small rings spaced alternately along said member, a single tooth projecting substantially radially from each small ring, a single tooth projecting substantially radially from each large ring, means preventing the relative motion of said rings on said member including means for emitting lubricant between said rings and said member upon any relative movement therebetween, a fixed breaker, means for mounting said fixed breaker means on said support means, said fixed breaker means comprising a plurality of long breaker elements and short breaker elements spaced alternately on a support with the long breaker elements opposite the small rings and the short breaker elements opposite the large rings, said means for mounting said fixed breaker means including a shear pin for maintaining the fixed breaker in wood breaking relation with the large and small teeth projecting from said rings along said rotary member under normal conditions.

5. A wood breaker apparatus as defined in claim 4 wherein said means for mounting said fixed breaker means further includes a pivot pin hingedly connecting said fixed breaker means and said support means so that upon an overload condition and the severence of the shear pin the fixed breaker means swings away from its wood breaking relation with the large and small teeth projecting from said rings along said rotary member and provides a path through which any foreign material causing the overload can leave the mechanism without causing further damage.

6. A wood breaker apparatus as defined in claim 5 including a conduit means on said support means below said breaker apparatus which receives wood after reduction therein, means on said support means above said conduit means and adjacent said breaker assembly for cooperating with said projecting teeth on said rings to cause wood passing through said breaker mechanism but insufficiently reduced therein to be repassed through said breaker apparatus for added reduction.

7. A breaker apparatus as defined in claim 6 in which said last means comprises an elongated curved screen mounted on said support below said rotor and spaced a distance from the outermost edges of the teeth projecting from said large rings.

8. A breaker apparatus as defined in claim 7 wherein said curved screen is pivotedly mounted at one end to said support means.

9. A breaker apparatus as defined in claim 7 wherein said curved screen is made up of sections with one section pivotedly mounted at one end and held in place at the other end by a latch mechanism.

10. A breaker apparatus as defined in claim 6 wherein said curved screen comprises a frame having a plurality of baffles running perpendicular to said large and small rings and a number of ribs for supporting said baffles positioned adjacent and below said small rings.

11. A breaker apparatus as defined in claim 8 wherein said latch mechanism includes an arm held in place by a shear pin to prevent it from dropping the screen as a result of vibration alone.

12. A breaker apparatus as defined in claim 10 wherein said latch mechanism is positioned adjacent said fixed breaker means so that upon an overload condition and the severance of the fixed breaker the fixed breaker means hits said latch mechanism shearing the shear pin holding the latch mechanism arm thus dropping one end of the screen so as to provide a path through which any foreign material causing an overload can leave without causing further damage.

13. In a wood breaker, a support, a member rotatably mounted on said support, a plurality of large rings and small rings mounted on said member coaxially with said member and spaced alternately along said member, each of said large rings having a large tooth support projecting substantially radially from each large ring and having a bore therein extending transversely of the rings' axis, a large tooth and screw forged in one piece extending through said bore, the top of said tooth extending approximately ¼ inch beyond the extended base circle of said support, a tooth projecting substantially radially from each small ring, severable means non-rotatably securing said rings to said member including lubricant emitting means for decreasing friction between said rings and said rotatably mounted member upon the severance of the severable means non-rotatably securing said rings to said member.

References Cited
UNITED STATES PATENTS

| | | | |
|---|---|---|---|
| 1,100,174 | 6/1914 | Dale | 241—243 |
| 1,758,180 | 5/1930 | Stein | 241—32 X |
| 1,761,083 | 6/1930 | Liggett | 241—32 |
| 1,854,844 | 4/1932 | Kaemmerling | 241—32 |
| 1,877,121 | 9/1932 | Borton | 241—32 |
| 2,297,782 | 10/1942 | Krider | 241—243 |
| 2,986,347 | 5/1961 | Stevenson | 241—190 X |
| 3,202,369 | 8/1965 | Judd | 241—190 |
| 3,220,658 | 11/1965 | Shelton | 241—191 X |

LESTER M. SWINGLE, Primary Examiner

D. G. KELLY, Assistant Examiner

U.S. Cl. X.R.

241—60, 73, 190, 191